Figure 1:
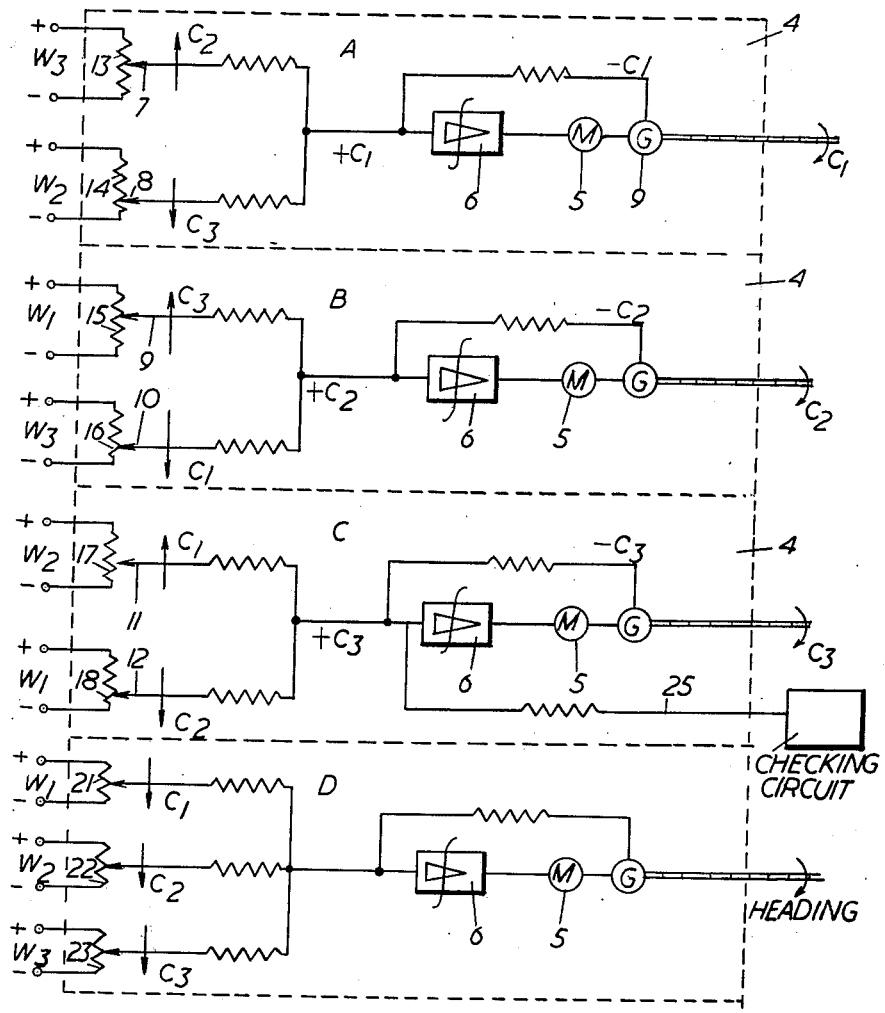

Aug. 14, 1962   E. E. BARBER ETAL   3,049,297
ANALOG COMPUTERS
Filed March 26, 1957   4 Sheets-Sheet 1

Inventors
Ernest Edward Barber
Kenneth Henry Simpkin
By Darby & Darby
Attorneys

Inventor
Ernest Edward Barber
Kenneth Henry Simpkin
By Darby & Darby
Attorneys

United States Patent Office 3,049,297
Patented Aug. 14, 1962

3,049,297
ANALOG COMPUTERS
Ernest Edward Barber, South Harrow, and Kenneth Henry Simpkin, Aylesbury, England, assignors to General Precision Systems Limited, a corporation of Great Britain
Filed Mar. 26, 1957, Ser. No. 648,565
9 Claims. (Cl. 235—180)

This invention relates to analog computers for continuously representing the attitude of one spatial reference system with respect to another.

More particularly the invention relates to analog computers for use in flight simulating equipment in which the attitude of a simulated aircraft must be represented either with respect to the vertical to earth or to the three axes of an orthogonal system of which one may be the vertical to earth. The present application is a continuation-in-part of application Serial No. 473,684, filed December 7, 1954.

In flight simulating equipment, such as that employed for training aircraft operating personnel, it is frequently necessary to determine the attitude in azimuth, or "heading" of the simulated aircraft, in addition to determining the orientation, or attitude, of the simulated flight with respect to the horizontal plane of the earth. Heading is usually determined with respect to the north-south axis of the earth in the horizontal plane, while the remaining aspects of attitude, i.e., the angles of pitch and roll, normally may be determined with respect to the vertical to earth. The angle of simulated heading is required, for example, in simulating the operation of compass equipment and certain types of radio navigation systems, and for recording the path of simulated flight over a map.

In conventional flight simulators of the prior art, one example of which is disclosed by U.S. Patent No. 2,584,261, issued Feb. 5, 1952, to R. C. Davis et al., the rate of change of heading angle may be computed and integrated with respect to time by a servo-mechanism which logs heading angle directly. This method of computation, however, is unsatisfactory if the simulated aircraft is to be capable of manoeuvres such as loops or vertical climbs in which the longitudinal axis of the aircraft, i.e., its nose-to-tail line, or its axis of flight, passes through the vertical line to the earth. Whenever such manoeuvres are performed the simulated aircraft heading may change instantaneously by as much as 180 degrees. Since servo-mechanisms are not capable of achieving the infinitely high rate of integration required by such instantaneous reversals of heading, errors arise in integrated heading computations after such manoeuvres. While many modern types of aircraft, notably jet propelled military fighter aircraft and guided missiles, are capable of vertical flight, the flight simulators of the prior art have been incapable of accurately reproducing these manoeuvres because of the above mentioned limitations inherent in their analog computational systems.

One of the objects of the invention is to overcome the limitations of the prior art by providing an analog computer system which is capable of accurately and continuously computing simulated aircraft attitude in all manoeuvres of simulated flight, including vertical flight.

Another object of the system is to provide a simplified analog computer system for continuously defining the attitude of a simulated aircraft in flight.

A more general object of the invention is to provide an improved analog computer system for continuously representing the angular relationship of one orthogonal spatial reference system with respect to one or more axes of another such system.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

The objects of the invention are achieved by an analog computer wherein a plurality of elements which define the angular relationship between the axes of two spatial reference systems are conditioned not in accordance with the angles themselves but in accordance with the cosines of those angles. In flight simulators of the prior art, means are shown for computing the angles of simulated aircraft roll, pitch and yaw (or heading). In such prior art computers the rates of changes of these angles may be represented by voltages. In the present invention these voltages are converted into the cosines of the angles between the aircraft axes and the spatial reference axes. The condition of the attitude-defining members of the invention may be influenced either electrically or mechanically. For example, the outputs from computers arranged according to the invention may be in the form of voltages varying both in magnitude and sign; or, they may be in the form of mechanical shaft speeds or displacements.

Figure 2:
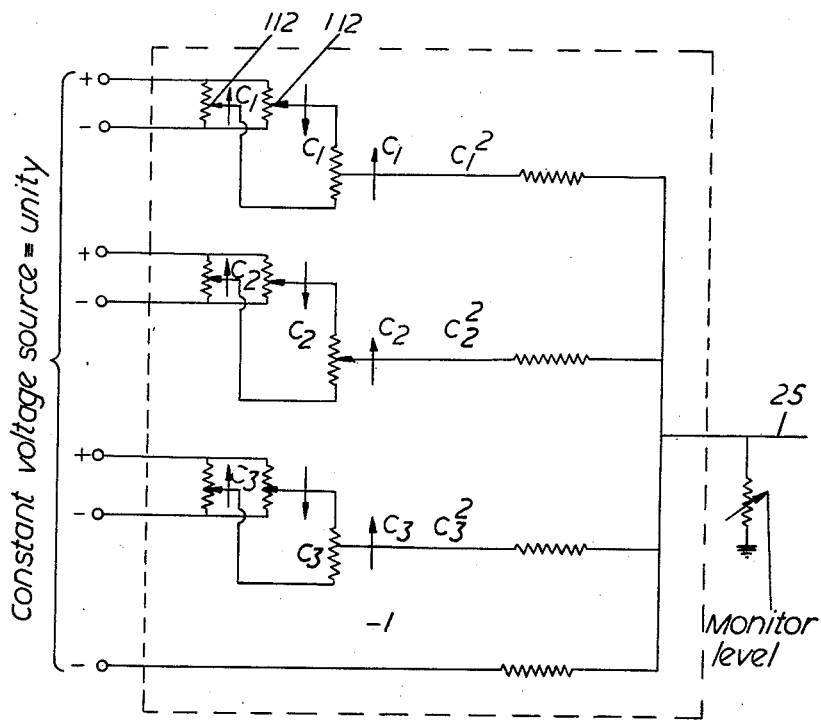

In order that the invention may be thoroughly understood, an example of a preferred embodiment in the computer system of a flight simulator will now be described with reference to the accompanying drawings in which:

FIGURE 1 is a schematic diagram of a simplified analog computer having four servo units, such as may be employed in simulating the flight of an aircraft incapable of vertical flight, wherein simulated attitude is expressed in terms of three angles between the three axes of the aircraft (or flight path reference axes) and the vertical to the earth, plus a fourth angle representing azimuthal heading;

FIGURE 2 is a schematic diagram of an error-checking circuit which may be used in combination with the computers of FIGURE 1 for even greater accuracy and reliability of continued computation.

Figure 3:
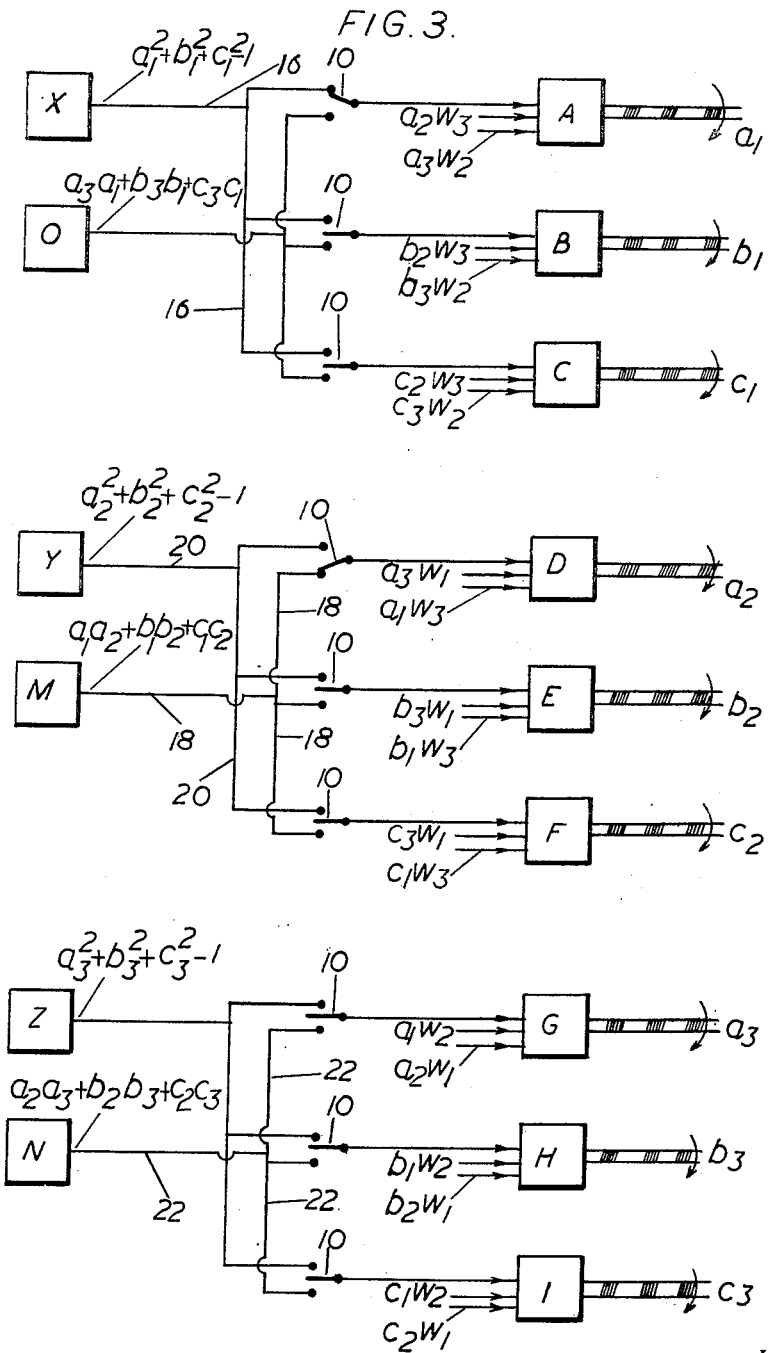
Figure 4:
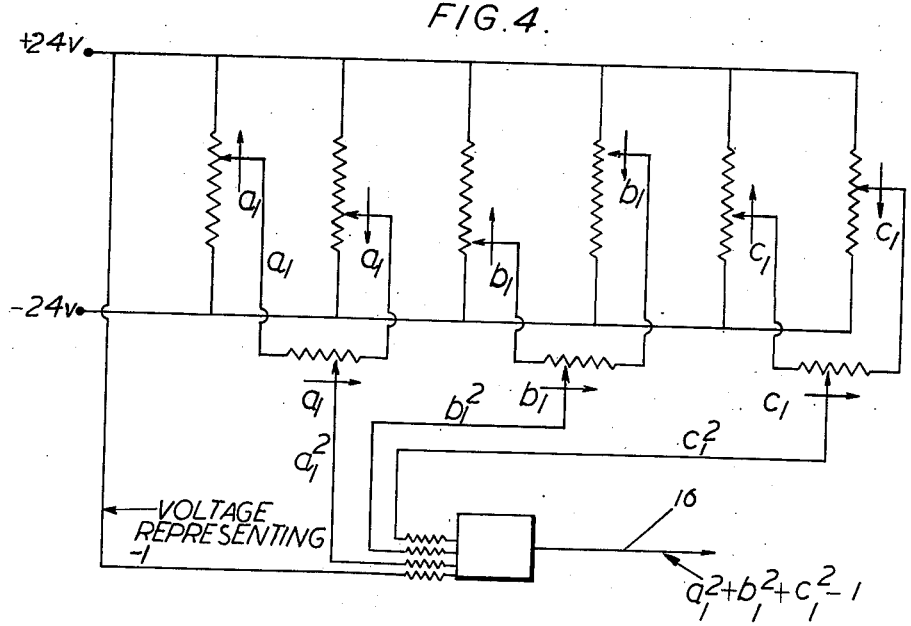
Figure 5:
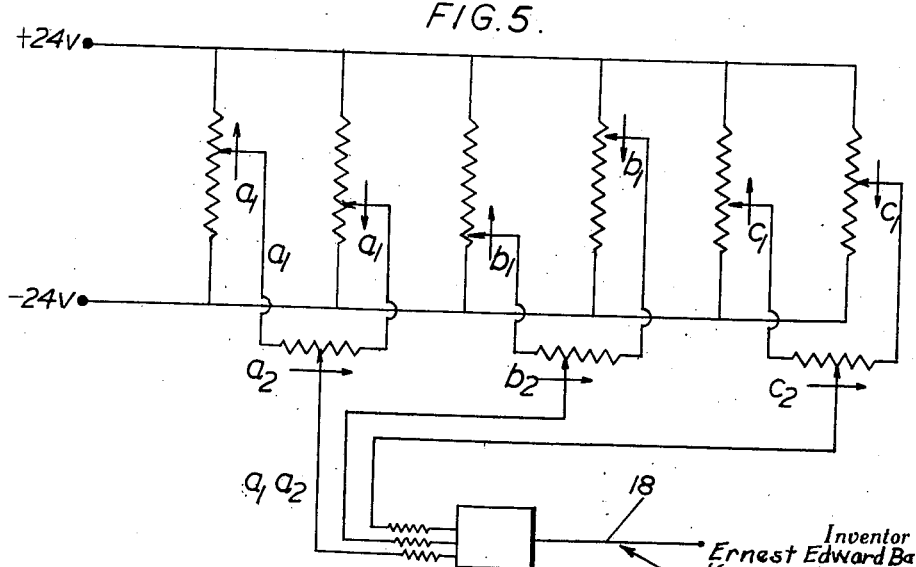

FIGURE 3 is a schematic diagram showing nine servo units interconnected to continuously compute the cosines of all nine angles between the three axes of a simulated aircraft (or flight path reference system) and three axes of a spatial reference system, such as may be employed to simulate flight manoeuvres in any direction, including vertical flight; and FIGURE 4 is a diagram of a circuit which may be used in combination with FIGURE 3 for providing the "sum of the squares" signals for a purpose to be explained below; and FIGURE 5 is a diagram of a circuit used in combination with FIGURE 3 for providing the "sum of the products" signal, for a purpose to be explained below.

In the simpler embodiment of the invention, the orientation of the simulated aircraft with respect to earth can be treated as the angular relationship between an orthogonal set of three aircraft structure axes, namely:

(1) A nose-to-tail or "rolling" axis;
(2) A transverse "pitching" axis at right angles to (1); and
(3) The perpendicular to (1) and (2), and a vertical axis $c$ perpendicular to the earth (assumed to be flat).

The simpler embodiment of the invention will first be described by detailed reference to FIGURE 1 of the drawings.

The principal feature of the attitude-defining part of this computer is a group of three electromechanical servo units A, B and C (FIGURE 1) each having an electric motor 5 controlled by an electronic amplifier 6 to adjust respectively three pairs of potentiometer sliders 7—8, 9—10 and 11—12 to computed settings. The output setting for each servo unit is the computed instantaneous value of the cosine of the angle between the axis $c$, and one of the axes 1, 2, 3. For convenience hereinafter, such a cosine value will be signified by $c_1$, $c_2$ and $c_3$ as the outputs of servo units A, B and C, respectively.

If $\omega_1$, $\omega_2$, and $\omega_3$, are respectively the instantaneous angular rolling, pitching and yawing rates of the aircraft about its own structure axes, 1, 2, 3, it can be shown that the value of the cosine $c_1$ at any instant is given by $$c_1 = \int_0^t (\omega_3 c_2 - \omega_2 c_3) dt$$

and that the other two cosines are given by similar integral equations with the integrand in brackets using rates and already computed cosines in cyclic progression, as it were.

Thus, referring to FIGURE 1, assuming voltages representing $\omega_1$, $\omega_2$, and $\omega_3$ to have been obtained elsewhere in the computer, these may be so used as the input supply voltages to the pairs of potentiometers 13—14, 15—16 and 17—18 whose sliders 7—8, 9—10 and 11—12 are driven by the three servos A, B and C in accordance with the cosine values $c_1$, $c_2$, $c_3$, to obtain at the potentiometer sliders voltages representing all the "cosine times angular rate" terms in the integrands. For example, in the case of the $c_1$ servo, control voltages $\omega_3$ and $\omega_2$ are used as the supply voltages to the two potentiometers 13 and 14, the sliders 7 and 8 of which are driven by the other two servos in accordance with the cosine values $c_2$ and $c_3$ respectively. The sliders of the several input potentiometers in FIGURE 1 are each mechanically coupled to one of the output motor shafts $c_1$, $c_2$ or $c_3$ whereby the sliders are driven by their respective shafts in the directions indicated by the several arrows in FIGURE 1. Thus, output shaft $c_2$ drives potentiometer sliders 7 and 12, shaft $c_3$ drives sliders 8 and 9, and shaft $c_1$ drives sliders 10 and 11, as shown by the arrows in FIGURE 1. In similar fashion the several potentiometers of the voltage deriving networks in the error correcting circuit of FIGURE 2 are also coupled to and driven by the corresponding shafts $c_1$, $c_2$ and $c_3$ in the directions indicated by the arrows of FIGURE 1. The manner in which the circuit of FIGURE 2 operates to correct cumulative errors will be described hereinafter.

In the case of the $c_1$ servo control, the $\omega_3 c_2$ and $\omega_2 c_3$ voltages so obtained, and the voltage output of a feedback generator 9 driven by the $c_1$ servo motor 5, are all three algebraically summed in the input circuit of amplifier 6, which controls the servo motor 5 itself, so that the latter runs at a speed proportional to the sum of the two input control voltages. $\omega_2 c_3 + \omega_3 c_2$, and consequently positions its potentiometer group in accordance with the time integral of this quantity, i.e. in accordance with the cosine $c_1$ as defined by the equation quoted above. The technique for obtaining the time integral of a computed voltage is well known in the art relating to analog computers, and is disclosed, for example, by Mynall, "Electrical Analogue Computing," in Electronic Engineering, July 1947. An alternative is to use the well-known electronically-integrating type of amplifier (with condenser feedback) driving the motor as a conventional positional servo.

The second and third servo units, B and C in FIGURE 1, may be identical in all respects to servo unit A, with their potentiometer sliders 9—10 and 11—12 being driven in the directions of the arrows in FIGURE 1 by the outputs $c_3-c_1$ and $c_1-c_2$, respectively, as described above.

The fourth servo unit, D in FIGURE 1, is similar to the first three servo units, A, B and C, except that all three angular rate potentials, $\omega_1$, $\omega_2$ and $\omega_3$ are applied to three potentiometers, 21, 22 and 23 in order that the output of servo D may represent the rate of change of simulated aircraft heading.

Where the aircraft attitude to the vertical axis is defined by the three cosines $c_1$, $c_2$ and $c_3$ it can be shown that the rate of change of heading is given by the expression:

$$\omega_1 c_1 + \omega_2 c_2 + \omega_3 c_3$$

A signal representing this summation is obtained from the cosine system and applied to heading integrator D. Thus it will be seen that the inputs to the integrator of unit D representing angular rates of change $\omega_1$, $\omega_2$ and $\omega_3$ are varied in accordance with the cosine output shaft positions of the three electro-mechanical servo units A, B and C, and the output position of servo unit D represents the heading.

In a system according to the invention, it is possible for imperfection in the equipment used to result in integrators not operating at exactly the called-for rates. Over a period of time, such inaccuracies will have a cumulative result giving the effect of loss of orthogonality of the axes 1, 2, 3 of and of errors in the relationship with axes $a$, $b$ or $c$. It can be shown that the system of FIGURE 1 will be orthogonal and will not be in error if the following equation is satisfied:

$$(c_1)^2 + (c_2)^2 + (c_3)^2 = 1$$

It will be evident that this quantity can be computed as a voltage by the appropriate use of potentiometers positioned by the cosine-logging servo units themselves. According to a preferable feature of the invention this is done, and any deviation from unity of the voltage so obtained is added to any one of the integrands in the input side of the system in the correcting sense.

FIGURE 2 shows a checking circuit for this purpose. The input to the circuit is supplied by a constant voltage source approximating to unity. The sliders 112 of the potentiometer groups are operated according to the outputs $c_1$, $c_2$ and $c_3$ to provide the products $(c_1)^2$, $(c_2)^2$ and $(c_3)^2$. The elements of the equation:

$$(c_1)^2 + (c_2)^2 + (c_3)^2 - 1 = 0$$

are algebraically summed, and any voltage deviation from the correct one is applied via connecting line 25 as an auxiliary integrand to the input side of any one of the summing amplifiers 6 (FIGURE 1) of the three servo units. In FIG. 1 the correcting potential on conductor 25 is shown being applied to the input circuit of the C integrator. It will be evident that any correction applied to one servo unit of the group A, B, C, will also automatically correct the other two, since the output of each servo unit of the three controls the inputs of all the other servo units.

The system of FIGURE 1 is will suited to the continuous computation of simulated aircraft attitude, including heading, for all aspects of simulated flight except vertical flight. As many classes of aircraft in general use today are incapable of vertical or near-vertical flight, this simplified computer system may enjoy extensive use. Where it becomes necessary to simulate flight passing through the vertical axis to the earth, the principles of the computer of FIGURE 1 may be extended, by adding further servo units, to continuously compute the cosines of all nine angles between the three references axes of the aircraft (or flight reference system) and all three axes of any other spatial reference system, as, for example, the vertical axis to the earth and the north-south and east-west axes in the plane of the earth.

Reference is now made to FIGURE 3 of the drawings, which illustrates an expansion of the simplified computer system of FIGURE 1 to continuously compute the cosines of all nine angles between the three axes of one orthogonal system (e.g. aircraft or flight reference system) and the three axes of another orthogonal reference system (e.g. the earth reference system).

The aircraft structure axes may be the same as those described in reference to the simplified system of FIGURE 1, namely:

(1) The nose-to-tail or "rolling" axis;

(2) The transverse or "pitching" axis at right angles to (1); and (3) The heading or "yawing axis which is perpendicular to (1) and (2).

The earth reference axes may be:

(a) A first horizontal direction, e.g. north-south;

(b) A second horizontal direction at right angles to (a), e.g. east-west; and (c) The vertical to the earth, at right angles to (a) and (b).

This embodiment of the invention employs three groups of three servo units, A, B, C; D, E, F; and G, H, I (FIGURE 3) each of which is structurally identical to servo unit A described above in reference to FIGURE 1.

Input voltages $\omega_1$, $\omega_2$, and $\omega_3$ representing the rates of simulated angular motion about the three aircraft axes are applied to each of the three groups of servos in a manner identical to that described with reference to FIGURE 1. Similarly the sliders of the several input potentiometers (not shown) are driven by the outputs $c_1$–$c_3$, $b_1$–$b_3$ and $a_1$–$a_3$ respectively of their own group of servo units, in the directions indicated by the arrows in FIGURE 1 to produce voltages representing the "cosine times angular rate" terms.

The output from each of the nine servo units in FIGURE 3 represents the instantaneous computed value of the cosine of the angle between one of the reference axes $a$, $b$, $c$ and one of the simulated aircraft axes 1, 2, 3 computed as will be described below. For convenience in notation, the cosine of the angle between axis $a$ and axis 1 is designated $a_1$, the cosine of the angle between $b$ and 2 is given as $b_2$, and so forth; the cosines of all nine angles being identified as $a_1$, $a_2$, $a_3$, $b_1$, $b_2$, $b_3$, and $c_1$, $c_2$, $c_3$.

As explained above in reference to FIGURE 1, with $\omega_1$, $\omega_2$ and $\omega_3$ representing respectively the instantaneous angular rolling, pitching and yawing rates of the simulated aircraft about its own axes, 1, 2 and 3, the instantaneous value of a cosine, for example $a_1$, is given by $$a_1 = \int_0^t (\omega_3 a_2 - \omega_2 a_3)\,dt$$

and the values of the other eight cosines are given by similar integrations, which are automatically computed by the embodiment of the invention illustrated in FIGURE 3.

By continuously computing the cosines of all nine angles between the three orthogonal axes of two spatial reference systems, motion in any direction may be accurately simulated, including vertical flight motion wherein the aircraft longitudinal or flight axis 1 passes through the earth vertical axis $c$.

It has been customary in flight simulators of the prior art to evaluate the simulated aircraft attitude to the vertical by computing the rates of change of bank and pitch angles and then integrating these with respect to time. This technique involves the use of servos logging these angles themselves, so that use has to be made of sine/cosine resolving devices to obtain, for example, the various components of the aircraft's weight along its own axes of motion in computing the forces acting on it, and conversely, the components of its airspeed resolved into the vertical-to-earth axis system for computing its rate of climb and hence altitude. In a computer utilising the present invention, however, these resolving functions are performed by simple linear potentiometers, which may be positioned by servos directly in accordance with the trigonometrical functions of the attitude angles instead of at the angles themselves.

As is stated above, there are produced as outputs of the potentiometers of each unit A, B, C, D etc., voltages representing the "cosine times angular rate" terms which are applied with voltage output of feed back generator 9 (FIGURE 1) to the summing amplifier 6.

In order that the output shafts will always take up their correct cosine value positions, the inputs to the summing amplifier 6 must be modified by correcting factors. Now it can be shown that the nine directional cosine outputs are not in error if the following equations are satisfied:

$$a_1^2 + b_1^2 + c_1^2 - 1 = 0 \quad (1)$$
$$a_2^2 + b_2^2 + c_2^2 - 1 = 0 \quad (2)$$
$$a_3^2 + b_3^2 + c_3^2 - 1 = 0 \quad (3)$$
$$a_1 a_2 + b_1 b_2 + c_1 c_2 = 0 \quad (4)$$
$$a_2 a_3 + b_2 b_3 + c_2 c_3 = 0 \quad (5)$$
$$a_3 a_1 + b_3 b_1 + c_3 c_1 = 0 \quad (6)$$

Each of these six quantities can be computed as a voltage by appropriate use of potentiometers in the cosine logging servo units themselves, and any difference between the voltages so obtained and their theoretically correct values of unity or zero (as the case may be) is applied in a manner to be described to the input side of a selected servo unit to modify the integrand or cosine times angular rate inputs of the summing amplifiers 6. Illustrated in FIGURE 4 is a circuit for computing the first three equations (referred to as the "sum of the squares circuit") and in FIGURE 5 is a circuit for computing the second three (referred to as the "sum of the products" circuit).

The units X, Y, Z and M, N, O in FIGURE 3 represent the circuits for solving the sum of the squares Equations 1, 2 and 3 and the sum of the products Equations 4, 5 and 6, respectively. Each unit is connected to the appropriate servo unit by means of switch units 10 operated mechanically by each of the servo groups themselves as will be described, so as to apply the correcting factors to the input side of the amplifier 6.

It can be shown that of the direction cosines between an axis of one orthogonal system and the three axes of a reference system and of the other axes of the orthogonal system and one axis of the reference system only one can be at any time numerically greater than $1/\sqrt{2}$.

Thus, referring to the following table, in which each column includes all the direction cosines associated with the same aircraft axis and each row all those associated with the same reference axis, it will be seen that if one particular direction cosine exceeds $1/\sqrt{2}$ the others in the same column and row cannot do so.

| $a_1$ | $a_2$ | $a_3$ |
| --- | --- | --- |
| $b_1$ | $b_2$ | $b_3$ |
| $c_1$ | $c_2$ | $c_3$ |

The switch units 10 are arranged to be operated by that servo which has an output greater than $1/\sqrt{2}$ to connect a signal from the appropriate sum of the squares circuit to the input side of its own summing amplifier. For example, in the case of the group A, B, C, whose cosine outputs are $a_1$, $b_1$ and $c_1$ respectively, the output of circuit X is applied through conductor 16 and switch 10 to whichever servo has an output greater than $1/\sqrt{2}$. As illustrated in FIGURE 3, the circuit X is connected to the servo unit A.

At the same time as the sum of the squares circuits are connected to a particular servo unit, the appropriate sum of the products circuit is applied to the corresponding servo in the group associated with the next aircraft axis taken cyclically. The appropriate sum of the products circuit in each case will be that in which the products summed are the products of the two cosines outputs of the servos associated with the two aircraft axes mentioned above. For example, where the output of X is connected to A, the output of M, which is $$a_1 a_2 + b_1 b_2 + c_1 c_2 = 0$$

is connected through conductor 18 to D, and when the output of X is connected to B, the output of M is connected through conductor 18 to E, and so on.

Now referring to the servo group D, E, F, it will follow that if the sum of the squares circuit Y output is applied through conductor 20 and switch 10 to the servo D, the sum of the products circuit N will be connected by way of switch 10 and conductor 22 to servo G, and so on.

Switch units 10 comprise two switches on each servo which are closed only at certain settings of the servo. They are arranged so that one is closed if the direction cosine exceeds $+1/\sqrt{2}$ and the other if the direction cosine is more negative than $-1/\sqrt{2}$. Each switch is connected to power sources of opposite polarity. The moving member which moves between the two switches and which is operated by the servo, is connected to two relays through two rectifiers connected in opposite senses. Thus when either of the switches is closed only one relay can be operated.

One relay connects the output from the sum of the squares circuit to the integrator amplifier 6 (FIGURE 1), and the other connects the same circuit to a second input to the amplifier. The response of the amplifier to the input signals in the second case is opposite to that in the first. Now, if for example, one cosine value is too positive, the sum of the squares output will be greater than zero, and that sum is applied to the amplifier 6 through one of the relays, so as to cause the servo to make its output less positive. If, however, the servo output is too negative, the sum of the squares will also be greater than zero, and the servo must be moved so as to make its output less negative. This is achieved by applying the sum of the squares signal to the amplifier, in the opposite sense from that required when making the servo output less positive through the second input circuit.

As has been stated above, when the sum of the squares circuit is connected to a particular servo unit, the appropriate sum of the products circuit is applied to the corresponding servo in the group associated with the next aircraft axis, and it follows that switches operated in the same manner as those described above in connection with the sum of the squares circuit can be used to connect the sum of the products to the appropriate servo.

Although in the foregoing description the axes 1, 2, 3, of the aircraft orthogonal system are taken to be the axes of the structure of the simulated aircraft, it will be understood that in some computations it is more convenient to refer to other orthogonal systems, as for example the "flight reference system." Such a system could have orthogonal axes as follows:

(1) An axis along the line of flight (termed the wind axis).

(2) An axis perpendicular to (1) in the plane of the wings.

(3) An axis perpendicular to (1) and (2).

It will be understood that the invention is not limited to the particular application described herein. Other examples are the computers required in warfare training devices, where the significant angular relationship is that between an aircraft or guided missile and a moving target, for example, another aircraft.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. Analog computer apparatus for representing the angular relationships of a first orthogonal reference system having three axes with respect to a second orthogonal reference system having three axes, comprising, in combination, nine integrating means, said nine integrating means being arranged in three groups each comprising first, second and third integrating means, each of said groups being associated with a different axis of said first orthogonal reference system, means for deriving three input potentials, each of said input potentials being commensurate with an angular velocity about a different one of said three axes of said first reference system, and means responsive to each integrating means of each group for modifying the two of said three input potentials commensurate with angular velocities about the two axes of said first reference system other than said axis associated with said group, said two of said input potentials being modified separately in accordance with the output of each of the integrating means of the other two groups, thereby providing eighteen further potentials, two different ones of said further potentials being applied to operate each of said integrating means, the two potentials being applied to each given integrating means of a group each comprising potentials commensurate with angular velocity about one of said axes of said first reference system other than said axis associated with said given integrating means, modified in accordance with the output of one of the integrating means of the other two groups of integrating means.

2. Analog computer apparatus for representing angular relationships of a first orthogonal reference system having three axes 1, 2 and 3 with respect to a second orthogonal reference system having three axes, $a$, $b$ and $c$, comprising, in combination, three groups of integrating means, each group being associated with one of said axes of said first system, each integrating means being responsive to a pair of applied input potentials and operative to provide an output quantity commensurate with the time integral of the resultant of its pair of applied input potentials; means for deriving input potentials commensurate with $\omega_1$, $\omega_2$ and $\omega_3$, representing angular velocities about said axes 1, 2 and 3 respectively; means operated by said second and third groups of integrating means for modifying said $\omega_1$ potential separately in accordance with the output of each of said integrating means of said second and third groups to provide $\omega_1 a_3$, $\omega_1 b_3$, $\omega_1 c_3$, $\omega_1 a_2$, $\omega_1 b_2$ and $\omega_1 c_2$ input potentials; means operated by said first and third groups of integrating means for modifying said $\omega_2$ potential separately in accordance with the output of each of said integrating means of said first and third groups to provide $\omega_2 a_3$, $\omega_2 b_3$, $\omega_2 c_3$, $\omega_2 a_1$, $\omega_2 b_1$ and $\omega_2 c_1$ potentials; means operated by said first and second groups of integrating means for modifying said $\omega_3$ potential separately in accordance with the output of each of said integrating means of said first and second groups to provide $\omega_3 a_2$, $\omega_3 b_2$, $\omega_3 c_2$, $\omega_3 a_1$, $\omega_3 b_1$ and $\omega_3 c_1$ potentials; circuit means for applying said $\omega_3 a_2$ and said $\omega_2 a_3$ potentials to the first integrating means of said first group to provide an $a_1$ output quantity from said integrator; circuit means for applying said $\omega_3 b_2$ and said $\omega_2 b_3$ potentials to the second integrating means of said first group to provide a $b_1$ output quantity from said integrating means; circuit means for applying said $\omega_3 c_2$ and said $\omega_2 c_3$ potentials to the third integrating means of said first group to provide a $c_1$ output quantity from said integrating means; circuit means for applying said $\omega_1 a_3$ and said $\omega_3 a_1$ potentials to the first integrating means of said second group to provide an $a_2$ output quantity from said integrating means; circuit means for applying said $\omega_1 b_3$ and said $\omega_3 b_1$ potentials to the second integrating means of said second group to provide a $b_2$ output quantity from said integrating means; circuit means for applying said $\omega_1 c_3$ and said $\omega_3 c_1$ potentials to the third integrating means of said second group to provide a $c_2$ output quantity from said integrating means; circuit means for applying said $\omega_2 a_1$ and said $\omega_1 a_2$ potentials to the first integrating means of said third group to provide an $a_3$ output quantity from said integrating means; circuit means for applying said $\omega_2 b_1$ and said $\omega_1 b_2$ potentials to the second integrating means of said third group to provide a $b_3$ output quantity from said integrating means; and circuit means for applying said $\omega_2 c_1$ and said $\omega_1 c_2$ potentials to the third integrating means of said third group to provide a $c_3$ output quantity from said integrating means.

3. Apparatus according to claim 1 in which at least one of said integrating means comprises an amplifier responsive to said two of said further potentials and a rate feedback potential, a motor connected to be driven from said amplifier, and a tachometer generator mechanically driven by said motor and operative to provide said rate feedback potential.

4. Apparatus according to claim 1 in which at least one of said integrating means comprises an operational amplifier responsive to said two of said further potentials and a feedback potential, a capacitor connected between output and input circuits of said amplifier to provide said feedback potential, and an electrical position servomechanism connected to said output circuit of said amplifier.

5. Apparatus according to claim 1 in which said means responsive to each integrating means for modifying said input potentials comprise linear potentiometers positioned by said integrating means and excited by said input potentials.

6. Apparatus according to claim 2 having correction circuit means individual to each of said groups, said correction circuit means comprising means for deriving three potentials each commensurate with the square of the output quantity of an individual integrating means, means for deriving a constant potential, means for algebraically combining said three potentials and said constant potential to provide a correction potential, and switching circuit means individual to each integrating means of a given group for applying said correction potential selectively to the input circuits of said integrating means of said given group.

7. Apparatus according to claim 2 having correction circuit means, said correction circuit means comprising, means responsive to the output quantities of the integrating means of said first and third groups for providing a first correction potential commensurate with $$a_1 a_3 + b_1 b_3 + c_1 c_3$$

means responsive to the output quantities of said first and second groups for providing a second correction potential commensurate with $a_1 a_2 + b_1 b_2 + c_1 c_2$, means responsive to the output quantities of said second and third groups for providing a third correction potential commensurate with $a_2 a_3 + b_2 b_3 + c_2 c_3$, switching circuit means individual to each integrating means of said first group for selectively applying said first correction potential to the input circuits of said integrating means of said first group, switching circuit means individual to each integrating means of said second group for selectively applying said second correction potential to the input circuits of said integrating means of said second group, and switching circuit means individual to each integrating means of said third group for selectively applying said third correction potential to the input circuits of said integrating means of said third group.

8. An analog computer for continuously representing the angular relationship of a first orthogonal spatial reference system with respect to one or more axes of a second such system comprising a plurality of means for combining groups of input factors representing angular rates of motion about the axes of a first orthogonal system, means for integrating said combined input factors in each group, a plurality of output elements representing the integrals of said combined input factors of each group, and linear multiplying and adding means for operating upon the input factors of each group by the output elements of other groups in order that said output elements be conditioned in accordance with the cosines of the angles between the axes of said first and second reference systems, said input factors representing angular rates of motion about three axes of an aircraft, and said output elements comprising three members which are conditioned by said integrating means in accordance with the cosines of the respective angles between the aircraft axes and an axis vertical to the plane of the earth, said computer including a fourth output member which is conditioned in accordance with the aircraft heading.

9. An analog computer for continuously representing the angular relationship of a first orthogonal spatial reference system with respect to one or more axes of a second such system comprising a plurality of means tor combining groups of input factors representing angular rates of motion about the axes of a first orthogonal system, means for integrating said combined input factors in each group, a plurality of output elements representing the integrals of said combined input factors of each group, and linear multiplying and adding means for operating upon the input factors of each group by the output elements of other groups in order that said output elements be conditioned in accordance with the cosines of the angles between the axes of said first and second reference systems, said computer having nine output elements conditioned respectively in accordance with the cosines of the nine angles between the three axes of each of two orthogonal reference systems.

References Cited in the file of this patent

UNITED STATES PATENTS

| | | |
|---|---|---|
| 2,476,747 | Lovell | July 19, 1949 |
| 2,742,227 | Bubb | Apr. 17, 1956 |
| 2,805,022 | Shelley | Sept. 3, 1957 |
| 2,953,303 | Sedgfield | Sept. 20, 1960 |

OTHER REFERENCES

Applications of Computers to Aircraft Dynamic Problems (Hill, Ruthrauff and Dill), Proceedings of Western Computer Conference, Los Angeles, Feb. 4–6, 1953, published by IRE, June 1953, pages 128–139.